Jan. 10, 1967   W. V. DAVIS ETAL   3,297,021
SELF-CONTAINED INTRA ORAL STRAIN GAUGE
Filed April 22, 1964
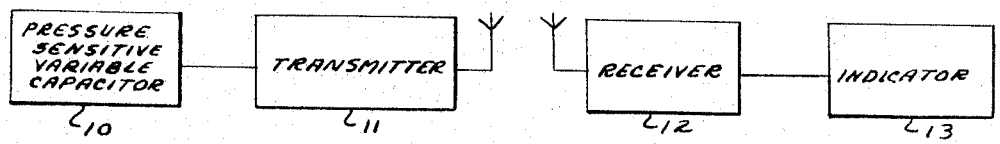
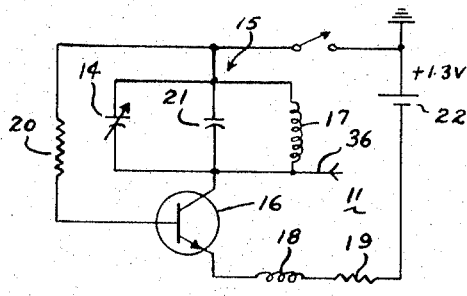
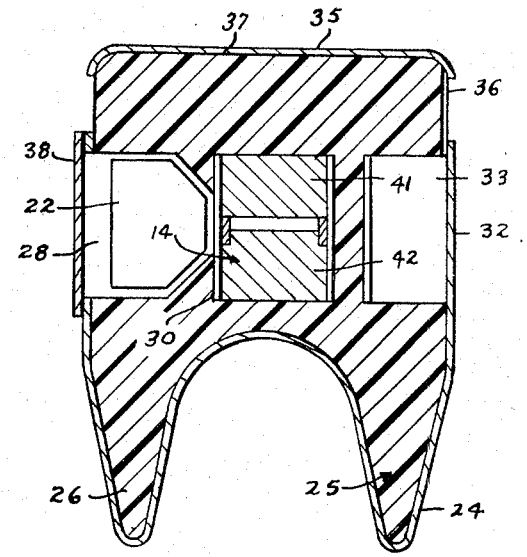
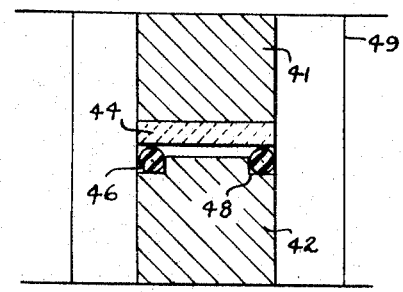
INVENTORS
WALTER V. DAVIS
LAUREL H. MAXWELL
BY
ATTORNEY
AGENT

United States Patent Office 3,297,021
Patented Jan. 10, 1967

3,297,021
SELF-CONTAINED INTRA ORAL STRAIN GAUGE
Walter V. Davis, Washington, D.C., and Laurel H. Maxwell, Kensington, Md., said Maxwell assignor to the United States of America as represented by the Secretary of the Army
Filed Apr. 22, 1964, Ser. No. 361,914
4 Claims. (Cl. 128—2)

The invention described herein may be manufactured and used by or for the United States Government for governmental purposes without the payment to us of any royalty thereon.

This invention relates to a self-contained electronic intra oral strain gauge.

One object is to provide a method for determining the exact masticatory pressures exerted in various movements of the mandible by the musculature of the face and throat.

Another object of the invention is to provide a device for determining the pressures exerted between the jaws.

A further object is to provide a device for telemetering from an intra oral position to an outside source a signal for indicating the force between the maxilla and mandible in a situation where these two anatomical structures are brought together such as in chewing.

These and other objects will be more fully understood from the following detailed description taken with the drawing wherein:

FIG. 1 is a block diagram showing the telemetering system of the invention;

FIG. 2 is a circuit schematic of the strain gauge for the device of FIG. 1;

FIG. 3 is a schematic sectional view of the self-contained intra oral strain gauge of the device of FIG. 1;

FIG. 4 is an enlarged view of the variable capacitor for the device of FIG. 1.

It is sometimes desirable during prosthodontic procedures, or in the treatment of bone and tissue disease, to determine the forces between the maxilla and mandible of the person being treated. According to this invention this information is made available by telemetering from in intra oral position to an outside indicator. A variable capacitor in the frequency determining circuit of a transmitter is varied by compression of a compressible substance beneath the top chewing surface of an artificial tooth. A change in the space between the plates of the variable capacitor varies the frequency of the VHF oscillator in the transmitter circuit. The frequency readout device may be an FM receiver, the output of which may be applied to a meter calibrated to indicate the force on the tooth in pounds per square inch. Also any Panoramic Spectrum Analyzer such as the model SPA-3 for interpreting the frequency may be used.

Referring now to FIG. 1 of the drawing, reference number 10 refers to a pressure sensitive variable capacitor connected in the frequency determining circuit of the oscillator in transmitter 11. The signal from the transmitter 11 is picked up by the receiver 12 and applied to an indicator 13 such as a meter which may be calibrated to show the pressure in desirable units; for example, in pounds per square inch. The output of the receiver may also be applied to a recorder if desired.

The circuit for the transmitter is shown in FIG. 2. The variable capacitor 14 is connected in the frequency determining circuit 15 connected in the collector circuit of the transistor 16. This circuit may also include a fixed capacitor 21 and the usual inductance coil 17 in the frequency determining circuit 15. This circuit also includes a feedback and base biasing resistor 20, a radio frequency choke 18, an emitter current limiting resistor 19, and the battery 22.

The circuit elements of FIG. 2 are located within the artificial tooth as shown in FIG. 3. The gold tooth-shaped capsule 24 having a cavity 25 therein is filled with a compressible potting material 26, for example, silicone or a thermosetting plastic such as an epoxy. Chambers for holding the circuit elements are molded or cut in the compressible potting material. FIG. 3 shows three chambers, chamber 28 containing the battery 22, and chamber 30 containing the pressure sensitive capacitor 14 and a chamber 32 containing the other circuit elements shown in a container 33. A separate container 33 may not be needed as the elements may be merely mounted on an insulator support. The capacitor 14 is located within the artificial tooth wherever the pressure measurement is desired. A gold cap 35 is secured to the potting material at 37 by any well known means such as by an adhesive. A lead 36 connects the oscillator circuit to the gold cap which is insulated from the remainder of the tooth cavity and acts as an antenna. A ground connection to the capsule 24 may be provided. A battery cover 38 may be secured to the tooth capsule 24 by means of an adhesive or other well known means such as a spring clip or screw which will permit removal of the battery. For certain uses the capsule 24 may have other shapes than the tooth shape.

The variable capacitor, as shown in FIG. 4, has two electrodes 41 and 42 with a high dielectric constant spacer 44 such as a ceramic material located between the electrodes and is secured to electrode 41 by any well known means such as an adhesive. The high dielectric constant spacer 44 prevents shorting across the gap and makes it possible to obtain sufficient variation in the capacitance between no pressure and maximum pressure to provide a proper indication of pressure. An air gap is provided between the spacer 44 and electrode 42 by means of a resilient ring 46 of a material such as rubber. The ring 46 is held in position by a projection 48 on electrode 42. The capacitor elements may be placed in an epoxy tube 49 before insertion within the tooth to maintain the elements in alignment.

In the operation of the device the artificial tooth is located in a partial denture which is located in the test subject's mouth. The battery is located in place, thus turning on the transistor oscillator circuit. Separate switch means may be provided if desired. Pressure between the jaws against the gold cap 35 causes compression of the compressible material 26 and also compresses the rubber ring 46, thus decreasing the air gap in the condenser. The change in capacitance corresponding to the change in spacing of the plates of capacitor 14 causes a frequency shift in the oscillator circuit of transmitter 11. The receiver 12 receives this signal and applies a signal proportional to the frequency shift to the indicator 13.

There is thus provided a self-contained intral oral strain gauge for determining the pressures exerted between the jaws.

While a certain specific embodiment has been described, it is obvious that numerous changes may be made without departing from the general principles and scope of the invention.

We claim:

1. An intra oral strain gauge comprising: a transmitter including an oscillator circuit, a pressure sensitive capacitive element in said oscillator circuit, a tooth-shaped hollow element, a compressible potting means, within said tooth-shaped element for holding said oscillator circuit and said capacitive element within said tooth-shaped element, said pressure sensitive capacitive element being centrally located within said tooth-shaped element, tooth cap means responsive to pressure on said tooth for transmitting said pressure to said compressible potting material and to said pressure sensitive capacitor; means for connecting said cap means to said oscillator circuit to thereby provide an antenna for said transmitter.

2. An intra oral strain gauge comprising: a transmitter including an oscillator circuit, a pressure sensitive capacitive element in said oscillator circuit, said pressure sensitive capacitive element including two spaced electrodes, a dielectric spacer secured to one of said electrodes, and a resilient rubber ring located between said electrodes to provide a variable space therebetween, a tooth-spaced hollow element, a compressible potting means, within said tooth-shaped element, for holding said oscillator circuit and said capacitive element within said tooth-shaped element, said pressure sensitive capacitive element being centrally located within said tooth-shaped element, tooth cap means responsive to pressure on said tooth for transmitting said pressure to said compressible potting material and to said pressure sensitive capacitor, means for connecting said cap means to said oscillator circuit to thereby provide an antenna for said transmitter.

3. An intra oral strain gauge comprising: a tooth-shaped hollow element, said tooth-shaped element being filled with a compressible potting material; a first cavity in said potting material centrally located within said tooth-shaped element; at least one additional cavity in said potting material adjacent said first cavity; a transmitter having a high frequency oscillator circuit therein; a pressure sensitive capacitor in oscillator circuit, said pressure sensitive capacitor being located in said first cavity; the other circuit elements of said oscillator circuit being located in said additional cavity; antenna means connected to the output of said oscillator circuit; and means, responsive to pressure on said tooth, for transmitting said pressure to said compressible potting material and to said pressure sensitive capacitor.

4. An intra oral strain gauge comprising; a tooth-shaped hollow element said tooth-shaped element being filled with a compressible potting material, a first cavity in said potting material centrally located within said tooth-shaped element; at least one additional cavity in said potting material adjacent said first cavity; a transmitter having a high frequency oscillator circuit therein; a pressure sensitive capacitor in oscillator circuit; said pressure sensitive capacitive element including two spaced electrodes, a dielectric spacer secured to one of said electrodes, and a resilient rubber ring located between said electrodes to provide a variable space therebetween, said pressure sensitive capacitor being located in said first cavity; the other circuit elements of said oscillator circuit being located in said additional cavity; antenna means, connected to the output of said oscillator circuit; and means, responsive to pressure on said tooth, for transmitting said pressure to said compressible potting material and to said pressure sensitive capacitor.

References Cited by the Examiner

UNITED STATES PATENTS

| | | | |
|---|---|---|---|
| 2,907,320 | 10/1959 | De Weese et al. | 128—2 |
| 3,218,638 | 11/1965 | Honig. | |
| 3,231,834 | 1/1966 | Watanabe | 128—2.1 X |
| 3,239,935 | 3/1966 | Shackleford | 32—19 |

RICHARD A. GAUDET, *Primary Examiner.*

W. E. KAMM, *Assistant Examiner.*